United States Patent
Chaiken

(10) Patent No.: US 11,157,625 B2
(45) Date of Patent: Oct. 26, 2021

(54) VERIFYING BASIC INPUT/OUTPUT SYSTEM (BIOS) BOOT BLOCK CODE

(71) Applicant: Dell Products, L.P., Round Rock, TX (US)

(72) Inventor: Craig Lawrence Chaiken, Pflugerville, TX (US)

(73) Assignee: Dell Products, L.P., Round Rock, TX (US)

(*) Notice: Subject to any disclaimer, the term of this patent is extended or adjusted under 35 U.S.C. 154(b) by 82 days.

(21) Appl. No.: 16/806,627

(22) Filed: Mar. 2, 2020

(65) Prior Publication Data

US 2020/0202003 A1   Jun. 25, 2020

Related U.S. Application Data

(62) Division of application No. 15/902,250, filed on Feb. 22, 2018, now Pat. No. 10,621,354.

(51) Int. Cl.
*G06F 21/57* (2013.01)
*G06F 11/10* (2006.01)
*G11C 29/52* (2006.01)

(52) U.S. Cl.
CPC ........ *G06F 21/572* (2013.01); *G06F 11/1048* (2013.01); *G06F 11/1068* (2013.01); *G06F 21/57* (2013.01); *G11C 29/52* (2013.01); *G06F 2221/033* (2013.01)

(58) Field of Classification Search
CPC .............................. G06F 21/572; G06F 21/57
See application file for complete search history.

(56) References Cited

U.S. PATENT DOCUMENTS

| | | | | |
|---|---|---|---|---|
| 5,457,785 A * | 10/1995 | Kikinis | ...................... | G06F 1/16 703/24 |
| 5,963,142 A * | 10/1999 | Zinsky | ................ | G06F 12/1433 340/5.74 |
| 7,178,167 B1 * | 2/2007 | Katoh | ...................... | G06F 21/31 726/26 |
| 2009/0089526 A1 * | 4/2009 | Kuo | .......................... | G11C 8/20 711/163 |
| 2011/0131662 A1 * | 6/2011 | Matsuoka | ............... | G06F 21/88 726/26 |
| 2011/0225585 A1 * | 9/2011 | Mealey | .................... | G06F 9/526 718/100 |
| 2013/0276128 A1 * | 10/2013 | Konetski | ............... | G06F 21/572 726/26 |
| 2015/0235029 A1 * | 8/2015 | Morishige | ............. | G06F 21/572 713/1 |
| 2016/0224810 A1 * | 8/2016 | Shahidzadeh | ........... | G06F 21/88 |

* cited by examiner

Primary Examiner — Joseph D Torres
(74) Attorney, Agent, or Firm — Fogarty LLP

(57) ABSTRACT

Systems and methods for verifying Basic Input/Output System (BIOS) boot block code are described. In some embodiments, an Information Handling System (IHS) may include: a processor; a memory coupled to the processor, the memory comprising BIOS instructions stored thereon; and an embedded controller (EC) coupled to the memory, the EC configured to: after a power-on sequence of the IHS is initiated and before a power rail of the processor is turned on, unlock write access to the memory; perform an Error Correction Code (ECC) evaluation of a BIOS boot block code portion of the BIOS instructions; verify integrity of the BIOS boot block code portion; lock write access to the memory; and allow the processor to execute the BIOS instructions.

11 Claims, 3 Drawing Sheets

VERIFYING BASIC INPUT/OUTPUT SYSTEM (BIOS) BOOT BLOCK CODE

CROSS-REFERENCE TO RELATED APPLICATIONS

This application is a divisional of, and claims benefit of, U.S. patent application Ser. No. 15/902,250, titled VERIFYING BASIC INPUT/OUTPUT SYSTEM (BIOS) BOOT BLOCK CODE and filed on Feb. 22, 2018, hereby incorporated by reference herein in its entirety.

FIELD

This disclosure relates generally to Information Handling Systems (IHSs), and more specifically, to systems and methods for verifying Basic Input/Output System (BIOS) boot block code.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In most IHSs, low-level code is used as an intermediary between hardware components and the IHS' Operating System (OS) and other high-level software. In some IHSs, this low-level code is known as the Basic Input/Output System (BIOS). The BIOS provides a set of software routines that allow high-level software to interact with hardware components using standard calls. Because of limitations of the BIOS in many IHSs, however, a new specification for creating code that is responsible for booting the IHS has been developed that is called the Extensible Firmware Interface (EFI) Specification.

The EFI Specification describes an interface between the OS and the system firmware. In particular, the EFI Specification defines the interface that platform firmware must implement and the interface that the OS may use in booting. How the firmware implements the interface, however, is left up to the manufacturer of the firmware. The EFI Specification also specifies that protocols should be provided for EFI drivers to communicate with each other. An EFI protocol is an interface definition provided by an EFI driver. The EFI core also provides protocols for allocation of memory, creating events, setting the clock, and other operations.

SUMMARY

Embodiments of systems and methods for verifying Basic Input/Output System (BIOS) boot block code are described herein. In an illustrative, non-limiting embodiment, an Information Handling System (IHS) may include: a processor; a memory coupled to the processor, the memory comprising BIOS instructions stored thereon; and an embedded controller (EC) coupled to the memory, the EC configured to: after a power-on sequence of the IHS is initiated and before a power rail of the processor is turned on, unlock write access to the memory; perform an Error Correction Code (ECC) evaluation of a BIOS boot block code portion of the BIOS instructions; verify integrity of the BIOS boot block code portion; lock write access to the memory; and allow the processor to execute the BIOS instructions.

In some implementations, the EC may be configured to unlock write access to the memory via a general-purpose input/output (GPIO) interface before an SLP_S3 signal is asserted during the power-on sequence. For example, the EC may be configured to unlock write access to the memory prior to the BIOS instructions executing a reset vector. Additionally, or alternatively, the EC may be configured to unlock write access to the memory prior to execution of an authenticated code module (ACM).

The ECC evaluation may be performed individually upon each of a plurality of sub-portions of the BIOS boot block code portion. Additionally, or alternatively, to verify the integrity of a given sub-portion of the BIOS boot block code portion, the EC may be further configured to compare a hash of the given sub-portion with a corresponding hash derived during BIOS binary image creation.

In some cases, the EC may be configured to identify an error in a bit of the BIOS boot block code; and provide a visual indication of the error via a Light-Emitting Diode (LED). Additionally, or alternatively, the EC may be further configured to: identify a first error in a bit of the BIOS boot block code; toggle a value of the bit; and perform another ECC evaluation of the BIOS boot block code before the power rail of the processor is turned on. Additionally, or alternatively, the EC may be configured to identify another error; and provide a visual indication of the error via a Light-Emitting Diode (LED).

In another illustrative, non-limiting embodiment, a method may implement one or more of the aforementioned operations. In yet another illustrative, non-limiting embodiment, a hardware memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 1:
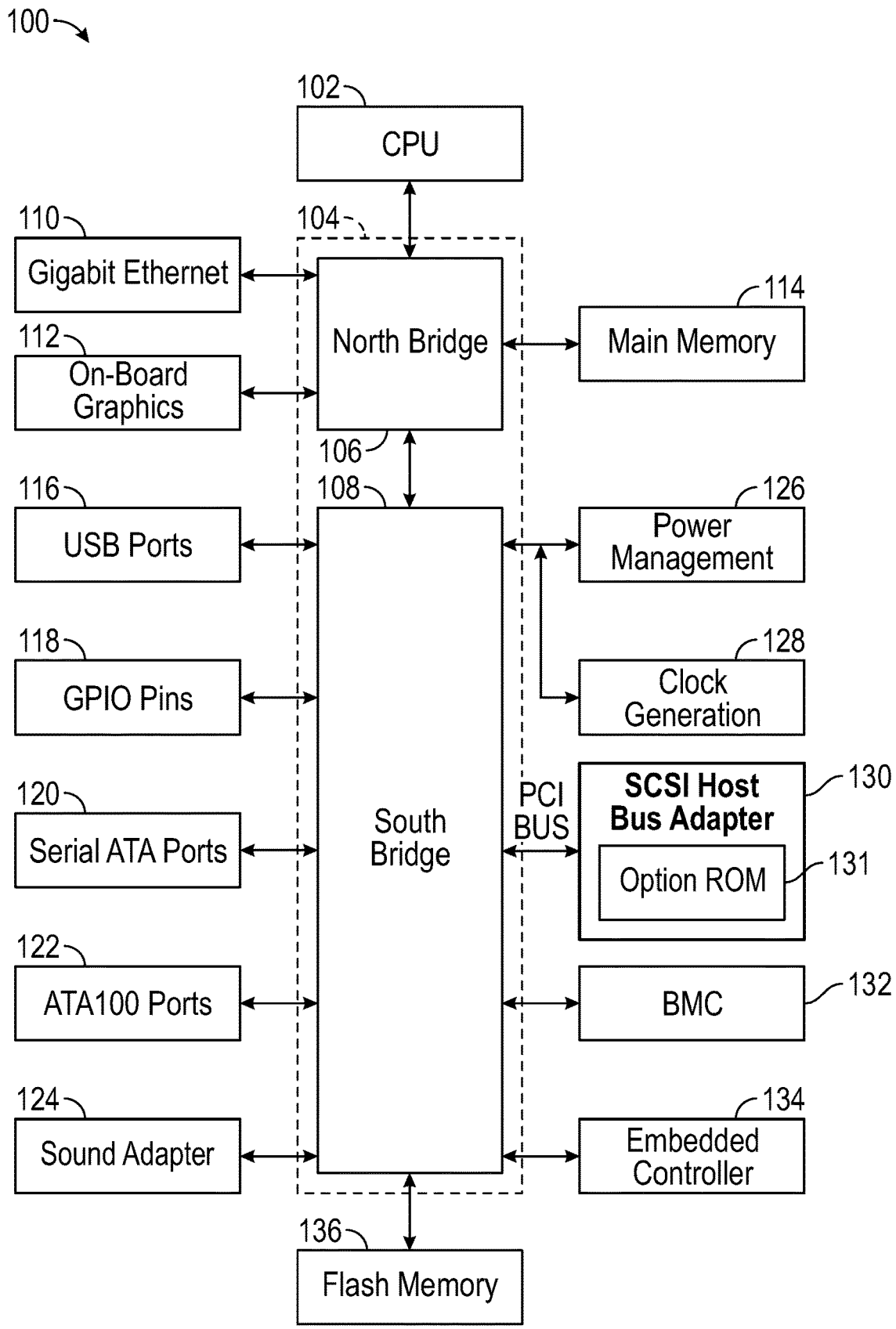
FIG. 1 is a block diagram of an example of an Information Handling System (IHS) according to some embodiments.

FIG. 1 shows an example of an IHS configured to implement the systems and methods described herein according to some embodiments. It should be appreciated that although certain embodiments described herein may be discussed in the context of a desktop or server computer, other embodiments may be utilized with virtually any type of IHS.

Particularly, IHS 100 includes a baseboard or motherboard, which is a printed circuit board (PCB) to which components or devices are coupled by way of a bus or other electrical communication path. For example, central processing unit (CPU) 102 operates in conjunction with Platform Controller Hub (PCH) or chipset 104; CPU 102 is a standard central processor that performs arithmetic and logical operations necessary for the operation of IHS 100.

Chipset or PCH 104 may include northbridge 106 and southbridge 108. Northbridge 106 provides an interface between CPU 102 and the remainder of IHS 100. Northbridge 106 also provides an interface to a random access memory (RAM) used as main memory 114 in IHS 100 and, possibly, to on-board graphics adapter 112. Northbridge 106 may also be configured to provide networking operations through Ethernet adapter 110. Ethernet adapter 110 is capable of connecting IHS 100 to another IHS (e.g., a remotely located IHS) via a network. Connections which may be made by network adapter 110 may include local area network (LAN) or wide area network (WAN) connections. Northbridge 106 is also coupled to southbridge 108.

Southbridge 108 is responsible for controlling many of the input/output (I/O) operations of IHS 100. In particular, southbridge 108 may provide one or more universal serial bus (USB) ports 116, sound adapter 124, embedded controller (EC) 134, and one or more general purpose input/output (GPIO) pins 118. In various embodiments, EC 134 may be configured to implement one or more operations described in FIG. 4.

Southbridge 108 may also provide a bus for interfacing peripheral card devices such as BIOS boot system-compliant SCSI host bus adapter 130. In some embodiments, the bus may include a peripheral component interconnect (PCI) bus. Southbridge 108 may also provide baseboard management controller (BMC) 132 for use in managing the various components of IHS 100. Power management circuitry 126 and clock generation circuitry 128 may also be utilized during the operation of southbridge 108.

Southbridge 108 is further configured to provide one or more interfaces for connecting mass storage devices to IHS 100. Mass storage devices connected to southbridge 108 and SCSI host bus adapter 130, and their associated computer-readable media, may provide non-volatile storage for IHS 100. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

In addition, southbridge 108 may include a Serial Peripheral Interface (SPI) communication interface that enables IHS 100 to include flash memory 136, such as a non-volatile random access memory (NVRAM), for storing firmware that includes BIOS program code containing routines that help to start up IHS 100 and to transfer information between elements within IHS 100. For example, flash memory 136 may include EFI firmware compatible with the EFI Specification and the Framework, as described in FIG. 3.

In some cases, a low pin count (LPC) interface (not shown) may also be provided by southbridge 108 for connecting Super I/O devices responsible for providing a number of I/O ports, including a keyboard port, a mouse port, a serial interface, a parallel port, and other types of input/output ports.

BMC 132 may include non-volatile memory having program instructions stored thereon that enable remote management of IHS 100. For example, BMC 132 may enable a user to discover, configure, and manage IHS 100, setup configuration options, resolve and administer hardware or software problems, etc. Additionally, or alternatively, BMC 132 may include one or more firmware volumes, each volume having one or more firmware files used by the BIOS' firmware interface to initialize and test components of IHS 100. As a non-limiting example of BMC 132, the integrated DELL Remote Access Controller (iDRAC) from DELL, INC.

It should be appreciated that, in other embodiments, IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize an architecture different than that shown in FIG. 1.

Figure 2:
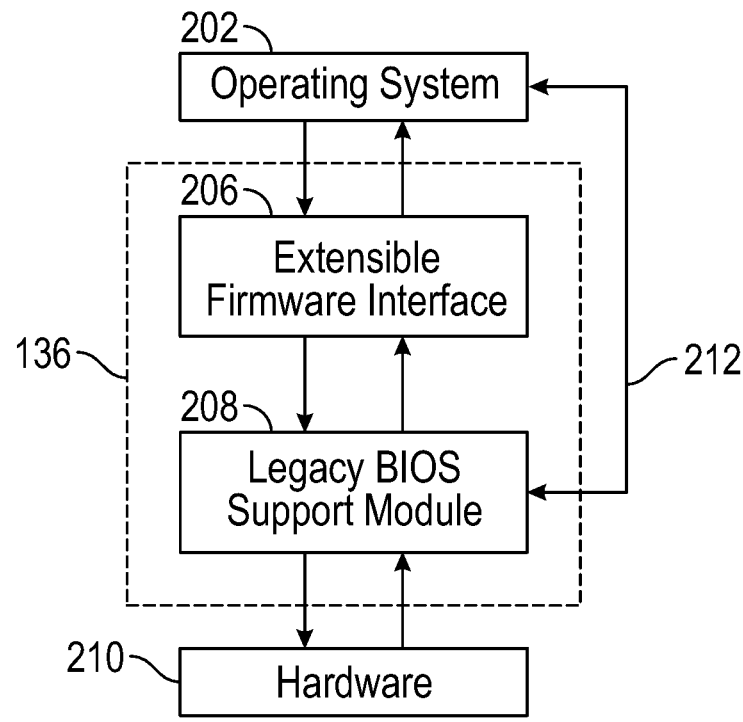
FIG. 2 is a block diagram of an example of a Unified Extensible Firmware Interface (UEFI) environment according to some embodiments.

Referring now to FIG. 2, examples of aspects of an EFI environment created by EFI firmware stored in flash memory 136 when executed by CPU 102 of IHS 100 are described according to some embodiments. As shown, flash memory 136 comprises a firmware compatible with the EFI Specification. The EFI Specification describes an interface between OS 202 and system firmware; particularly, the EFI Specification defines the interface that platform firmware of flash memory 136 implements, and the interface that OS 202 may use in booting. According to an implementation of EFI, both EFI 206 and legacy BIOS support module 208 may be present in flash memory 136. This allows IHS 100 to support both firmware interfaces.

Figure 3:
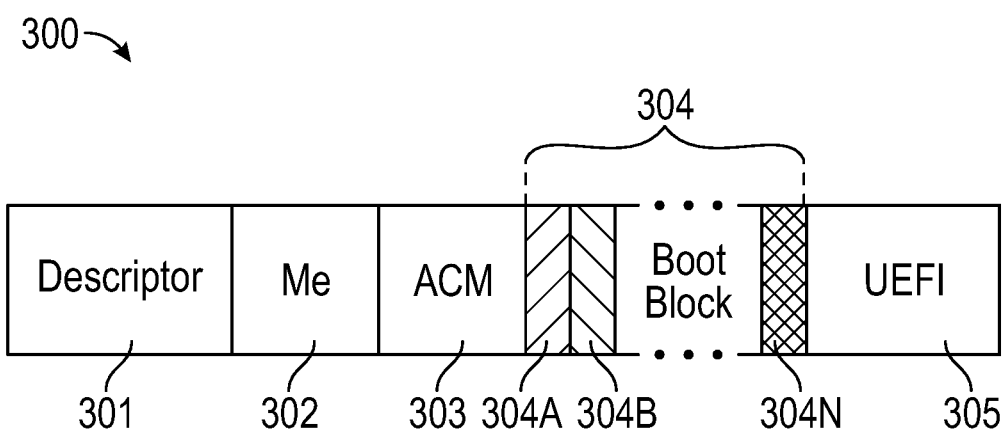
FIG. 3 is a block diagram of an example of Basic Input/Output System (BIOS) program instructions stored in a flash memory according to some embodiments.

In FIG. 3, program instructions 300 stored in flash memory 136 of an EFI-compliant IHS 100 are described. As shown, contents 300 include descriptor region 301, management engine (ME) portion 302, authenticated code module (ACM) portion 303, BIOS boot block portion 304, and UEFI firmware portion 305; such that BIOS boot block portion 304 is divided into a plurality of sections 302A-N.

Descriptor region 301 is a location of memory 136 where access rights are configured. ME portion 302 includes management code, such as remote management other code, generally provided and signed by the CPU manufacturer. ACM security code portion 303 is part of a Trusted Execution Technology (TXT) environment, and it uses measurements of software and platform components so that IHS 100 may make trust decisions with respect to both: BIOS boot block portion 304 and UEFI firmware portion 305.

In a conventional system, it is not possible for ACM security code portion 303 to correct errors in BIOS boot block portion 304. In a conventional boot process, before the BIOS can execute a reset vector, the ACM security code portion 303 must validate BIOS boot block portion 304. But, when the ACM security code portion 303 encounters even a single bit error in BIOS boot block portion 304 (in contrast with errors detected in UEFI portion 305, for example), it turns off power to IHS 100.

To address these, and other problems, flash memory 236 is shared with EC 134 in IHS 100. At least in part because EC 134 shares the SPI flash ROM, EC 134 can detect and correct errors in BIOS boot block portion 304 before ACM security code portion 303 has the opportunity to validate the contents of BIOS boot block portion 304.

Figure 4:
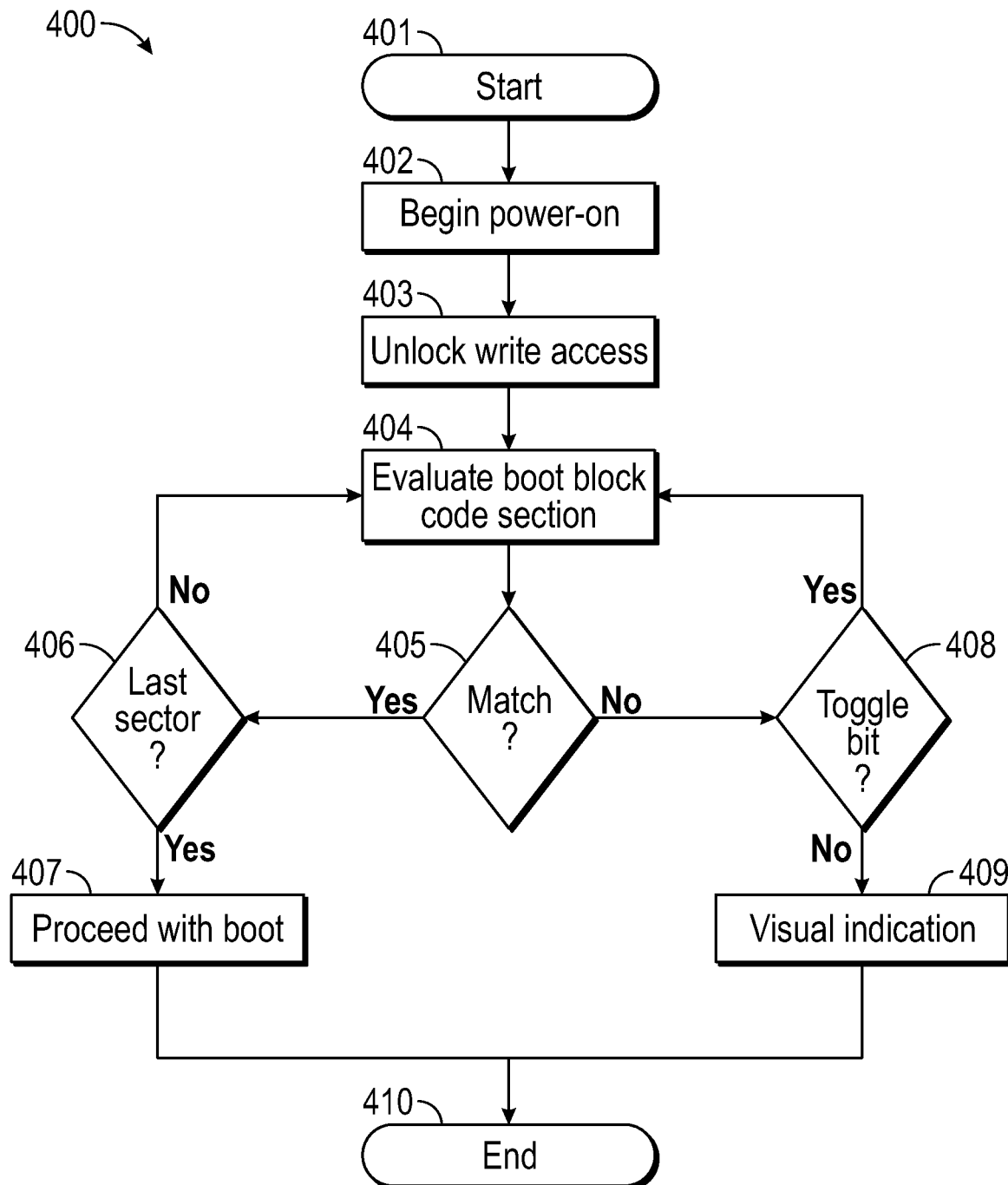
FIG. 4 is a flowchart of an example of a method for verifying BIOS boot block code using an embedded controller (EC) according to some embodiments.

Referring now to FIG. 4, a flowchart of an example of method 400 for verifying BIOS boot block code is depicted. In some embodiments, method 400 is performed by EC 134 independently of CPU 102 as method 400 starts at 401 and power is provided to IHS 100 at 402. At 403, EC 134 may unlock write access to BIOS boot block portion 304 of instructions 300 stored in SPI flash 136 by toggling a corresponding data access entry in descriptor portion 301.

At 404, before a supply voltage rail $V_{DD}$ (e.g., SLP_S3, which is dedicated to CPU 102 to the exclusion of any other IHS component) to CPU 102 is turned on (that is, before ACM code 303 is executed by CPU 102), EC 124 verifies the integrity of BIOS boot block portion 304. For example, during BIOS binary image creation by an IHS manufacturer, Error Correcting Code (ECC) data (e.g., 48 bytes) may be generated for each sector 304A-N (e.g., 4 Kbytes each) of entire boot block 304, such that the ECC data enables EC 134 to repair single-bit errors for each of sector 304A-N. As such, at 404, EC 134 may compare a stored hash with a presently calculated hash, and may identify single bit errors in boot block 304.

At 405, if the boot block code section at issue is verified and there are no more sections 304A-N to be examined, method 400 proceeds with a normal boot at 407, and method 400 ends at 410. In some cases, prior to proceeding with normal boot at 407, EC 124 may lock write access to BIOS boot block portion 304. If there are other boot block code sections to be evaluated, however, control returns to block 404.

Still at 405, if the boot block code section at issue has an error, method 400 toggles the corresponding bit of memory 136 at 408, and then re-evaluates the same boot block code section at 404. In some cases, a configurable number of bit toggling attempts may be performed (e.g., one attempt), after which method 400 provides a visual indication of a BIOS boot block code error at 409, before method 400 ends at 410.

For example, method 400 may report a BIOS boot block code mismatch by causing a Light-Emitting Diode (LED) on the IHS motherboard to blink at a pre-determined rate, with a predetermined color, etc., corresponding to an error code. Here it is noted that the ability to specifically notify service or customers of boot block corruption (e.g., in contradistinction with any other type of failure) is not present in conventional systems because, in such systems, the BIOS would simply not execute if a BIOS boot block code portion is not entirely fault-free.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. In an Information Handling System (IHS) comprising a processor; a memory coupled to the processor, the memory comprising Basic Input/Output System (BIOS) instructions stored thereon; and an embedded controller (EC) coupled to the memory, a method comprising:

unlocking, by the EC, write access to the memory after a power-on sequence of the IHS is initiated and before a power rail of the processor is turned on;

performing, by the EC, an Error Correction Code (ECC) evaluation of a BIOS boot block code portion of the BIOS instructions;

identifying, by the EC, an error in a bit of the BIOS boot block code; and providing, by the EC, a visual indication of the error via a Light-Emitting Diode (LED).

2. The method of claim 1, wherein the EC is configured to unlock write access to the memory via a general-purpose input/output (GPIO) interface before an SLP_S3 signal is asserted during the power-on sequence.

3. The method of claim 2, wherein the EC is configured to unlock write access to the memory prior to the BIOS instructions executing a reset vector.

4. The method of claim 3, wherein the EC is configured to unlock write access to the memory prior to execution of an authenticated code module (ACM).

5. The method of claim 4, wherein the ECC evaluation is performed individually upon each of a plurality of sub-portions of the BIOS boot block code portion.

6. The method of claim 1, wherein to verify the integrity of a given sub-portion of the BIOS boot block code portion, the EC is further configured to compare a hash of the given sub-portion with a corresponding hash derived during BIOS binary image creation.

7. An embedded controller (EC) coupled to a memory of an Information Handling System (IHS), wherein the memory includes Basic Input/Output System (BIOS) code executable by a processor of the IHS, the EC having program instructions stored thereon that, upon execution by the EC, cause the IHS to:

after a power-on sequence of the IHS is initiated and before a power rail of the processor is turned on, unlock write access to the memory;

perform an Error Correction Code (ECC) evaluation of a BIOS boot block code portion of the BIOS code;

identify a first error in a bit of the BIOS boot block code;

toggle a value of the bit;

perform another ECC evaluation of the BIOS boot block code;

identify another error; and provide a visual indication of the error via a Light-Emitting Diode (LED).

8. The EC of claim 7, wherein the EC is configured to unlock write access to the memory via a general-purpose input/output (GPIO) interface before an SLP_S3 signal is asserted during the power-on sequence.

9. The EC of claim 8, wherein the EC is configured to unlock write access to the memory prior to the BIOS instructions executing a reset vector.

10. The EC of claim 9, wherein the EC is configured to unlock write access to the memory prior to execution of an authenticated code module (ACM).

11. The EC of claim 7, wherein to verify the integrity of a given sub-portion of the BIOS boot block code portion, the EC is further configured to compare a hash of the given sub-portion with a corresponding hash derived during BIOS binary image creation.

* * * * *